May 31, 1955  D. M. POTTER  2,709,366
FLOW METER
Filed Dec. 2, 1949 2 Sheets-Sheet 1
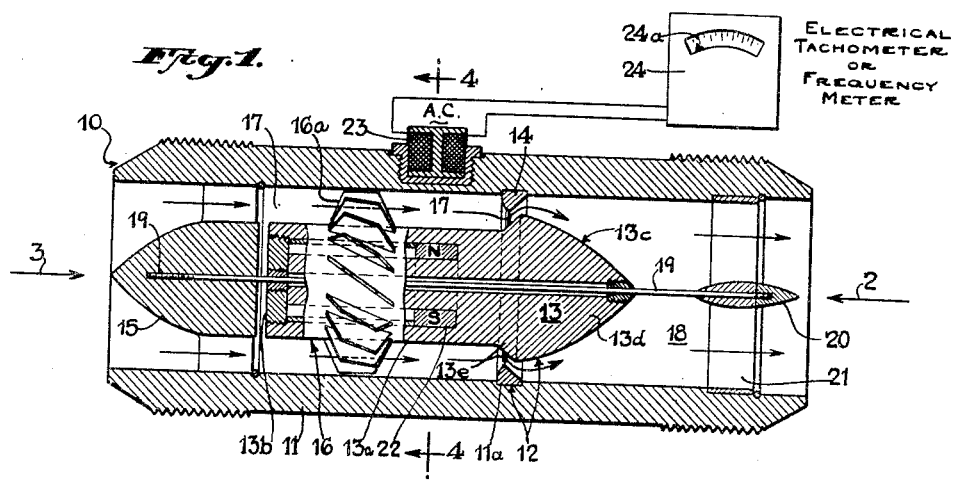
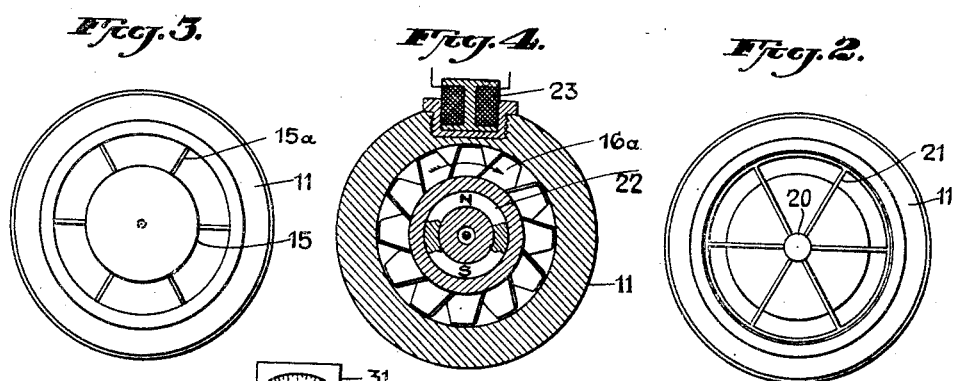
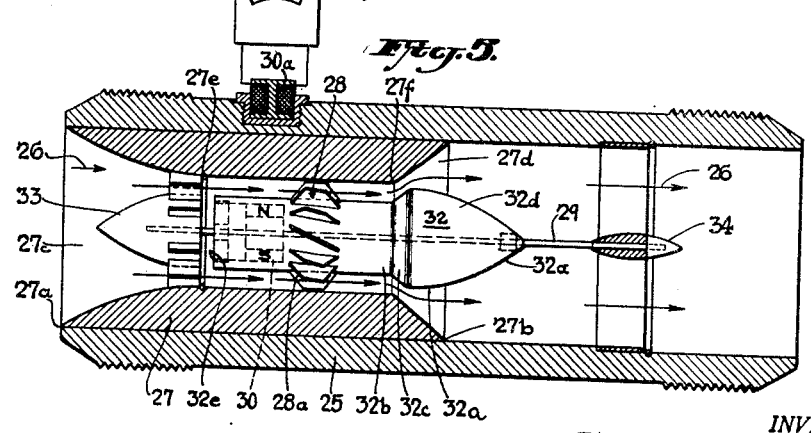
INVENTOR.
DAVID M. POTTER.
BY Ward, Crosby & Neal
ATTORNEYS.

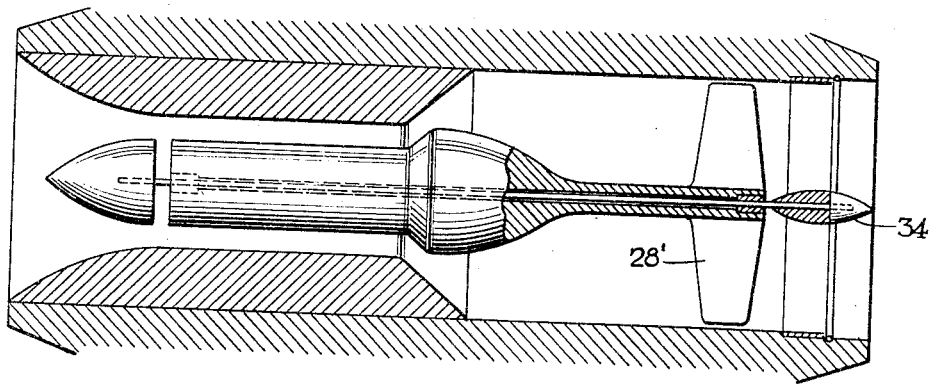
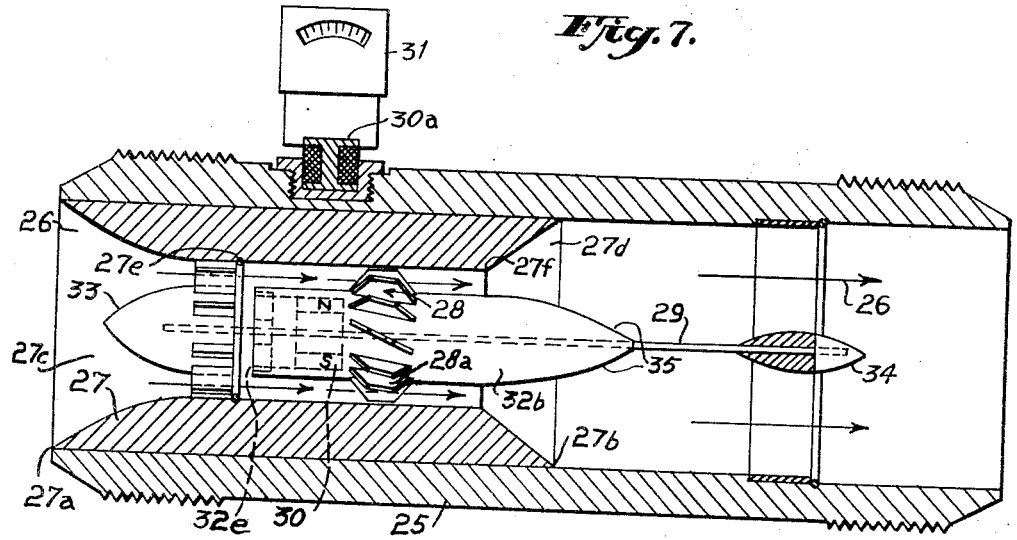

United States Patent Office 2,709,366
Patented May 31, 1955

2,709,366

FLOW METER

David M. Potter, Plainfield, N. J.

Application December 2, 1949, Serial No. 130,652

5 Claims. (Cl. 73—231)

This invention relates to fluid metering devices, and more particularly to a fluid flow meter of the rotor type.

Apparatus of this character suggested in the past have been subject to considerable disadvantage in that thrust bearings for the rotor have been necessary for absorbing thrusts acting in a downstream direction. Such thrust bearings have normally been subject to undesirable friction, heavy wear, and deterioration, particularly where the velocity head is substantial. Moreover, such bearings are subject to fouling by foreign particles. Such fouling usually results in the failure of the bearing and consequent necessary replacement, or at least in the necessity for dissembling the apparatus to clean the bearing.

Furthermore in the rotor types of flow meters heretofore proposed, it is quite common for the rotor also to become fouled by foreign particles, such as lint and paper, thereby necessitating dissembly for purposes of cleaning.

One of the objects of the present invention is to overcome the above difficulties or to reduce same to insignificance.

The invention in one aspect thereof comprises a conduit having therein a balance member which is held substantially in a constant position along the longitudinal axis of the conduit by means of balanced forces resulting from fluid pressures in the conduit, that is, the resultant of forces acting to force the balance member downstream are balanced by a resultant of forces tending to force such member upstream. A rotor or impeller which rotates in said conduit with a speed which is a function of the flow rate is connected to the balance member and thereby held in a substantially fixed axial position in the conduit without the use of axial thrust bearings. Such a balance of forces acting upon the balance member may be accomplished as follows:

(a) A region of relatively low pressure head and one of relatively high pressure head are created in response to a flow of fluid through the conduit by means of a change in cross-sectional area of the fluid passageway, for example, by means of a reduced throat or contraction in the conduit, or by enlarging the passageway therein.

(b) The rotor, which is provided with rotor blades, is connected to the balance member for axial movement therewith, if any. The rotor including its blades is of a diameter substantially equal to but slightly less than the inner diameter of the passage surrounding same. Fluid flow past the rotor blades creates a dynamic pressure tending to move the rotor and balance member downstream.

(c) The balance member is located with the downstream extremity or pressure face thereof subject to such relatively high pressure head which produces a force acting to move same upstream.

(d) A shield is located near, and upstream relative to, the balance member which counteracts to a preselected partial degree the force due to dynamic pressure or the effect of velocity head upon the balance member, such force or effect acting downstream. However, some preselected amount of force due to dynamic pressure may be permitted to act upon the balance member other than that due to the action of the fluid on said rotor blades. The forces due to dynamic pressures acting both on said blades and said balance member, of course, have components tending to force the balance member downstream. The sum of such components is augmented by another component of force due to pressure head upon at least a portion of the upstream face of the balance member. The balance member is so conformed that such three components of force are balanced against said oppositely directed force acting on the downstream pressure face of said member whereby the latter in operation is maintained at a substantially fixed position along the axis of the conduit.

By so controlling the position of such a balance member axially of the conduit, the necessity for thrust bearings to absorb thrust axially of the conduit is eliminated. The R. P. M. of the rotor is a function of the rate of flow of fluid through the conduit and thus by determining such R. P. M. the rate of flow can be metered. Conventional means may be employed for measuring the speed of rotation of the meter, for example, an electrical tachometer or frequency meter may be employed which is operatively associated with the rotor as by a magnet secured to and rotatable with the rotor which may generate an alternating current of measurable frequency in a suitable electrical circuit in electrical association therewith, such circuit including said electrical tachometer.

The above and further objects and novel features will more clearly appear from the detailed description when the same is read in connection with the accompanying drawings. It is to be expressly understood, however, that the drawings are for purposes of illustration only and are not intended as a definition of the limits of the invention, reference for this latter purpose being had to the appended claims.

In the drawings:

Fig. 1 is a longitudinal sectional view, partly in section and with parts broken away, showing one form of apparatus embodying the present invention;

Fig. 2 is a view of the righthand extremity of the device shown in Fig. 1;

Fig. 3 is a view of the lefthand extremity of the device shown in Fig. 1;

Fig. 4 is a sectional view taken substantially on line 4—4 of Fig. 1; and

Fig. 5 is a longitudinal sectional view of another embodiment of the present invention, certain parts not being shown in section for purposes of clarity.

Fig. 6 is a longitudinal sectional view of another form of the invention.

Referring to the drawings, one form of the invention is shown in Fig. 1 indicated generally at 10 which comprises a conduit 11 having therein so-called dynamic fluid balance means indicated generally at 12. The term "dynamic fluid balance means," as employed herein, includes within its purview:

(a) A balance member within a conduit wherein there is a region of relatively high fluid pressure head, such head acting on the downstream end areas of such member and a region of relatively low pressure head, the latter head acting on the upstream end areas thereof.

(b) A shield located upstream and near to such member for counteracting to a preselected partial degree the dynamic pressure which normally would act upon said member but for such shield, there being thus a preselected residual dynamic pressure acting upon the member tending to urge same downstream. Such residual dynamic pressure acts on the upstream face of the bulge or enlarged portion of the rotor as will appear hereinafter.

The component of the force tending to urge said member upstream and resulting from such relatively high pressure head is referred to as the upstream pressure head force and is designated "U." The component of the force tending to urge said member downstream and resulting from such lower pressure head is referred to as the downstream pressure head force and is designated "D."

The component of said residual dynamic pressure tending to urge the member downstream is referred to as the downstream residual dynamic force and is designated "R."

The relationship of forces is:

$$D+R+B=U$$

wherein B is the component of dynamic pressure tending to move the balance member downstream and due to dynamic pressure on the blades of an impeller to be described below.

In the form shown such "dynamic fluid balance means" are constituted by:

(1) A balance member as at 13 which is subjected to balanced forces resulting from the movement of fluid through the conduit 11 from left to right as viewed in this figure whereby it is held in a substantially fixed axial position in said conduit.

(2) Means for creating a difference in pressure head between two separate and preselected regions within said conduit. Such means comprise, for example, a restriction constituted by a removable split ring as at 14 which is positioned within a suitable annular groove 11a within the conduit 11.

(3) A shield 15 situated upstream relative to the balance member 13 and constructed and arranged of such preselected cross-sectional shape and area to counteract to a preselected degree the effect of velocity head upon the balance member 13.

A rotor or impeller as at 16 is operatively associated with the balance member 13 in such a manner that it is in fixed relation thereto and is positioned axially within the conduit 11 by such member. In the form shown, the impeller or rotor 16 is rigidly attached to the balance member 13 for axial and rotational movement therewith. For example, blades or fins 16a of the impeller 16 may be rigidly secured to an elongated body portion 13a of the balance member 13 if desired, such portion extending upstream relative to the restriction or throat at 14.

The angularity of the blades 16a, of course, produces, in cooperation with the fluid, a pressure which, by virtue of the holding of the rotor in a relatively fixed axial position, causes same to rotate. However, as above mentioned a dynamic pressure is exerted upon such blades which produces a force acting downstream.

That is, a component of the force which acts to rotate the rotor 16 acts in a downstream direction and this is one of the forces which, together with other forces, must be balanced by the forces acting upstream.

The overall diameter of the impeller or rotor 16 is preferably only slightly less than the inner diameter of the conduit 11 whereby there is reduced so-called fluid "slippage," and the speed of rotation of such rotor is substantially directly proportional to the rate of flow of fluid through the conduit. The balance member 13, in the form shown, rotates with the rotor 16 and the body portion 13a.

The shield 15 is fixedly mounted in the conduit as by radially extending fins 15a (Fig. 3) and is preferably substantially bullet-shaped with the point thereof directed upstream as shown. The cross-sectional area of the shield 15 measured in a direction normal to the longitudinal axis of the conduit is equal to and similar in shape to that of the elongated body portion 13a of the balance member 13. Thus the effect of velocity head upon the upstream end areas of the balance member as at 13b is substantially eliminated, the main force acting upon such end areas being that of the pressure head existing in the region 17 which, due to the increased velocity therein, is substantially less than the pressure head at the upstream extremity of the shield 15 and also is substantially less than the pressure head at the downstream extremity of the balance member 13 as at 18.

In the form shown, the righthand portion of the balance member 13 comprises an enlarged portion as at 13c which may be constituted by an ogival or bullet-shaped element 13d which is pointed downstream, and a frusto-conical portion 13e which is pointed upstream, the portions 13d and 13e having a common and adjacent base, the area of which is slightly in excess of that of the body portion 13a.

The portion 13c of the balance member 13, and particularly the frusto-conical element 13e thereof, is adapted for coacting with the restriction means as at 14 for providing a variable orifice in response to axial movement of the balance member.

That portion of the cross-sectional area of the balance member 13 represented by the difference between the maximum cross-sectional area of the portion 13c and the body portion 13a, is acted upon by the residual dynamic pressure "R." There is, of course, a pressure head which acts upon the frusto-conical portion 13e tending to force the balance member downstream. As above mentioned, there is produced a region of relatively low pressure head as at 17 caused by the restriction of the cross-sectional area of the fluid passage existing by virtue of the shield 15 and the body portion 13a. The restriction 14 produces therewithin another region of even lower relative pressure head. A region having a pressure head substantially higher than that at 17 and higher than that within the restriction 14 exists at 18 on the downstream side of the balance member 13.

The parts are so constructed and arranged that, in response to the passage of the fluid through the conduit, the pressure head forces acting on 13b and 13e, plus the dynamic pressure acting upon the blades 16a and at 13e in a downstream direction, are counterbalanced by the forces acting upstream due to the relative high pressure head in the region 18, such latter pressure acting upon the ogival surface 13c.

The rotor 16 thus may be held in a substantially fixed position axially of the tube.

It has been found desirable to mount the balance member 13 upon a central shaft 19 whereby said member may shift axially within preselected limits along said shaft. The latter may be mounted at the lefthand extremity thereof within the shield 15 and at the righthand extremity thereof (Fig. 1) within a suitable bearing or support 20 which comprises a streamlined element held centrally and coaxially within the conduit by means of radially extending fins 21 (Figs. 1 and 2).

It is not absolutely necessary for the balance member 13 to be axially shiftable along the axis of shaft 19 but it has been found desirable in order to avoid shocks due to the surging of the fluid through the conduit wherein sudden reciprocating movement of the balance member may occur.

The speed of rotation of the rotor 16, and thus the rate of flow of fluid through the conduit 11, is measured preferably by well known electrical means comprising, in the form shown, a ring magnet as at 22 mounted within the body portion 13a and rotatable with the rotor 16. The ring magnet 22 is in electrical cooperation with a coil 23 which is electrically connected to an electrical tachometer or frequency meter 24. An alternating current thus may be generated in the coil 23, the frequency of which is a direct function of the R. P. M. of the rotor, such frequency being measurable by the electrical tachometer 24 and indicated as rate of flow upon suitable indicia as at 24a.

Another embodiment of the invention is shown in

Fig. 5 and is constituted by a conduit 25 in which fluid flows from the left to right in the direction of arrows 26 through a contracted throat member 27 which, for example, extends in length from point 27a to 27b, the throat having a gradually converging inlet 27c and a somewhat more abruptly diverging outlet or mouth 27d. A portion of the throat 27 is of uniform circular cross-sectional area between the points 27e and 27f which respectively mark the terminal region of the inlet 27c and the beginning of the outlet 27d.

The throat 27, of course, creates a region of relatively low pressure in the contracted portion thereof as compared with the pressure in the conduit as at the mouth of the inlet 27c and also as compared with the pressure downstream from such throat. In the form shown in Fig. 5, a rotor or impeller 28 having blades 28a is mounted for rotation upon a shaft 29 which is coaxial with the conduit 25. The rotor 28 is located normally within that portion of the throat 27 which is of substantially uniform cross-sectional shape and area, namely, that portion between the points 27e and 27f. The diameter of the rotor blades 28a is substantially equal to but slightly less than the inner diameter of the contracted throat within which they are mounted, there being adequate clearance to avoid contact with the inner sides of the throat.

The rotor 28 is held in a substantially fixed position when in operation within the throat 27 through the intermediary of a balance member by balancing forces existing within the apparatus in a manner somewhat similar to that set forth above in connection with Fig. 1.

By so holding the rotor 28 in a substantially fixed axial position within the conduit 25, it is possible to eliminate the use of thrust bearings for absorbing axial thrust and to attain a very accurate measurement of flow. One of the reasons for such accuracy is that the friction occurring in such bearings is also eliminated. As above explained, the speed of rotation of the rotor 28 is a direct function of the rate of flow and consequently by employing suitable means for measuring such speed of rotation the rate of flow can be determined. In the form shown in Fig. 5, such speed responsive means are analogous to those shown in Fig. 1 and constitute, for example, a permanent magnet 30 which is secured to the rotor 28 for rotation therewith. Such magnet can be a ring magnet of well known type and is positioned for co-operation with a coil 30a which is electrically connected to an electrical tachometer or frequency meter 31 in a well known manner. The indications of the electrical tachometer, of course, are responsive to the frequency of the alternating current generated in the coil 30a.

The above-mentioned balance of forces within the conduit 25 whereby the rotor 28 is held in a substantially fixed axial position without the use of axial thrust bearings is accomplished with the assistance of a balance member 32 having a relatively enlarged tail portion 32a and a right circular cylindrical head portion 32b similar substantially in shape to the body portion 13a above described. The balance member 32, if desired, may be substantially hollow in order to reduce its weight and the shaft 29 may be associated therewith by means of journals on either extremity consisting of any suitable substance such as fluorinated paraffin. The head portion 32b is normally situated within the throat 27 between the points 27e and 27f and the tail portion 32a normally operates within the outlet 27d of the throat member 27 although a portion thereof extends beyond this outlet in a streamlined configuration in order to reduce the effects of turbulence. The elongated head portion 32b preferably has secured thereto the blades 28a of the rotor 28. However, the invention is not limited to the positioning of the rotor 28 within the throat 27, it being possible, for example, to locate the rotor at any desired position, for example, near the righthand extremity of the conduit 25 as at 28' shown in Fig. 6, providing, of course, the diameter thereof is substantially equal to but slightly less than the inner diameter of such conduit. In the event of so locating the rotor, suitable means must be provided for interconnecting same with the balance member 32 in order that the two are movable together in an axial direction or in order that the balance member can constrain the rotor to move in a substantially fixed spaced relation thereto.

The balance member 32 is circular in cross-section throughout its length as measured normal to the longitudinal axis thereof. The cylindrical portion 32b acting within the throat 27 acts further to restrict the passageway through which the fluid can flow and thus increases the velocity therethrough and further reduces the pressure head therein.

The relatively enlarged tail portion 32a comprises a frusto-conical element 32c located at the righthand extremity of the cylindrical portion 32b. The frusto-conical element 32c is pointed upstream and the base thereof is coincident with the base of a streamlined element 32d which is substantially bullet-shaped forming a so-called ogival point, elements 32c and 32d jointly forming the tail portion 32a.

The balance member 32, including the right circular cylindrical head portion 32b and the relatively enlarged tail portion 32a, coacts with the throat 27 to produce a region of straight or coaxial fluid flow throughout the distance between points 27e and 27f, and a so-called diverted flow around the elements 32c and 32d of the tail portion 32a. That is, the fluid flow is diverted from its straight path and is caused to flow from a direction parallel to the axis of the conduit outwardly. Thus a dynamic pressure is exerted upon the balance member 32 which tends to urge same downstream or to the right as viewed in Fig. 5. The force due to such dynamic pressure acts in conjunction with the force due to pressure head acting upon the lefthand extremity of the balance member 32 as at the end area 32e. The sum of these two forces, plus the force due to pressure head which acts upon the frusto-conical portion 13e, aforementioned, plus the dynamic pressure acting downstream on blades 28a, are balanced against a force acting upstream upon the tail portion 32a resulting from the pressure head which exists in the region to the right of the outlet 27d of the throat 27. Such pressure head is, of course, considerably greater than the pressure head existing within the throat 27 and acting upon the end area 32e.

In order to eliminate the effect of velocity head upon the area 32e, that is, in order to eliminate substantially the effect of dynamic pressure thereupon, a shield 33 is fixedly mounted upstream and close to the normal operating position of the upstream face 32e of the balance member 32. The shield 33 preferably is substantially bullet-shaped and pointed upstream.

Thus the equation of the balanced forces which hold the elements 28, 32 axially stationary in the conduit is:

$$B_d + D_{ph} + R_d + R_{ph} = U$$

wherein $B_d$ represents the component of force due to dynamic fluid pressure tending to force the elements 28, 32 downstream; $D_{ph}$ represents the component of force acting upon the upstream end area 32e due to pressure head tending to force such elements downstream; $R_d$ represents the component of force due to dynamic pressure acting downstream upon the face of element 32c; $R_{ph}$ represents the component of force due to pressure head acting downstream upon the face of element 32c; and U, as heretofore described, represents the component of force tending to urge such elements upstream due to relatively high pressure head in the region thereof.

The balance member 32 preferably is mounted upon said central shaft 29 and adapted for rotation with the rotor 28 and, if desired, may be mounted for free axial movement between the shield 33 and a downstream support 34 for the downstream extremity of the shaft 29, the upstream extremity thereof being preferably mounted in said shield 33.

The shield 33 and the support 34 may be rigidly secured respectively to the inner surface of the throat 27 and the conduit 25 by suitable radially extending fins as shown in Figs. 3 and 2.

If desired, a third form of the invention (Fig. 7) may be employed which is identical to that shown in Fig. 5 with the exception that the tail portion 32a of the balance member 32 is not relatively enlarged but is shaped as indicated by the lines 35 of Fig. 7, thereby eliminating the frusto-conical element 32c of Fig. 5 and thus eliminating the effect of a dynamic pressure upon element 32c tending to force the balance member 32 downstream. Such elimination of the enlarged tail portion causes an unbalance of the forces acting upon such member wherein the forces acting upstream in the region of the relatively high pressure head (to the right of the outlet 27d) overcome the forces tending to move such member downstream (occurring within throat 27). That is, the relatively higher pressure head in the region to the right of the throat outlet 27d acting upon the portion 35 is capable of overcoming the forces acting upon the upstream end area 32e and the downstream dynamic pressure acting on blades 28a. In this embodiment consequently a suitable bearing surface should be provided to absorb thrusts acting in an upstream direction and, if desired, the upstream face 32e may bear against the flat downstream face of the shield 33 or, if desired, a suitable conventional ball bearing (not shown) may be employed.

In both of the embodiments of Figs. 1 and 5 no means are provided for restraining axial movement of the balance member between their respective shields and the downstream supports for their central shafts. It has been found desirable, particularly in the form of the invention of Fig. 5, to permit such free axial movement in order to provide an automatic or self-cleaning characteristic to the rotor of the device. For example, if some foreign substance, such as a strip of paper, were to become fouled in the blades of the rotor, the balance of pressures would be upset whereby the rotor would shift axially downstream to a region of larger cross-sectional area where the foreign particle can be dislodged by the action of the fluid. That is, as in the embodiment of Fig. 5, the rotor may shift to a region of larger cross-sectional area wherein the foreign matter may be thrown off and moved into the main stream of the fluid whereupon the rotor will return to its original position.

A shield of the type described herein, such as 15 or 33, is desirable to eliminate the need for a very large force differential acting upon the balance member which is due to pressure head differential. However, the device may be so constructed and arranged that such force differential is made sufficiently large whereby the shield may be eliminated. The term "dynamic fluid balance means" as set forth above includes within its purview such a device wherein the shield is so eliminated.

There is thus provided novel means for measuring the flow of a fluid through a conduit. The means are very simple in construction and highly sensitive in operation. Furthermore, there is entirely eliminated the necessity for thrust bearings to absorb downstream thrust.

While the invention has been described with respect to certain preferred examples which have given satisfactory results, it will be understood by those skilled in the art that various changes and modifications can be made without departing from the spirit and scope of the invention, and it is intended therefore in the appended claims to cover all such changes and modifications.

What is claimed is:

1. In apparatus of the class described, a conduit having a passage therethrough; restricting means in the passage, said means, in response to the passing of fluid through the passage, creating therein a region of relatively higher fluid velocity and lower fluid pressure as compared to fluid pressure and velocity on the downstream side of said restricting means; a balance member positioned near and on the downstream side of said restricting means; a rotor mounted upon a shaft substantially coaxially with said conduit, said rotor having blades for causing rotation by coaction with the fluid flowing in said conduit, said rotor also being free to shift axially of the conduit within preselected limits; means for interconnecting said rotor and balance member for movement together in rotation and axially of said conduit, said rotor passing through that portion of the passage which is restricted by said restricting means; and a shield positioned upstream relative to said balance member for counteracting to a preselected extent the effect of dynamic fluid pressure thereon, there being in response to fluid flow through the conduit a pressure head acting upon the downstream facing areas including the downstream end areas of said balance member urging same upstream, which head is balanced against the pressure and velocity heads urging said balance member downstream, the pitch of said blades being selected to achieve such balance; and means for producing a signal responsive to the speed of rotation of said rotor.

2. In apparatus of the class described, a conduit having a substantially uniform cross-sectional area, means for forming a contracted throat region in said conduit, such region being of smaller cross-sectional area, said region having an outlet, said conduit conducting fluid from an upstream to a downstream extremity thereof; a shield fixedly mounted in and coaxial with said conduit near and on the upstream side of said contracted throat region; a rotor mounted upon a shaft coaxial with said shield and said conduit, said rotor being adapted for rotation about the axis of said shaft and free to shift axially of the conduit, said rotor having blades for causing rotation by coaction with the fluid flowing in said conduit, and also having an enlarged portion on the downstream extremity thereof located on the downstream side of said contracted throat region and adapted for coacting with said throat region to form an orifice of adjustable area for the passage of fluid, the upstream extremity of said rotor being positioned upstream relative to the outlet of said throat region and close to said shield and electrical means magnetically coupled to said rotor for producing electrical impulses in response to the rotation of such rotor.

3. In a flow meter, a conduit having a circular cross-sectional area and including: a first portion of substantially uniform cross-sectional area, a second portion of relatively larger cross-sectional area, said portions being joined at a throat, such first portion being positioned upstream relative to said second portion; a balance member comprising a portion of expanding cross-sectional area measured from an upstream toward a downstream extremity thereof, said balance member during operation being positioned in said conduit closely adjacent to and on the downstream side of said throat; means for mounting said member for free axial movement in said conduit within preselected limits; an impeller having blades mounted in said conduit, means for connecting said impeller to said balance member for axial and rotational movement therewith; a shield mounted in said conduit upstream relative to said balance member for counteracting to a preselected extent the effect of velocity head upon said member; and means for producing a signal in response to the speed of rotation of said impeller, the maximum cross-sectional area of said balance member being larger by a predetermined amount than the maximum cross-sectional area of said shield, a preselected downstream force attributable to such difference in cross-sectional area acting upon said balance member in response to the passage of fluid through said conduit, the angularity of the blades of said impeller being preselected for producing a preselected downstream component of force also in response to the passage of fluid through said conduit, such forces being balanced against an upstream force acting on said member attributable to high pressure head upon the downstream end areas thereof.

4. In a flow meter, the combination including: a conduit having a contracted throat comprising a tubular portion of substantially uniform cross sectional area and a flare portion of expanding cross sectional area measured from the upstream toward the downstream extremities thereof, said contracted throat forming a low fluid pressure head region therein and a relatively higher pressure head region at the downstream extremity thereof and in said flare portion; a balance member positioned in said conduit in said flare portion with the downstream end areas thereof located in said region of relatively higher pressure head and the upstream end areas located in said region of low pressure head, means for mounting said balance member for free axial movement in said conduit within preselected limits, said balance member having a cross sectional area normal to the longitudinal axis of said conduit which is at least equal substantially to the cross sectional area of said tubular portion; an impeller; means interconnecting said impeller with said balance member for rotational and axial movement therewith, said impeller having blades for inducing rotation thereof in response to the passage of fluid, a shield member fixedly mounted in said conduit on the upstream side of said balance member and during normal operation closely adjacent to such balance member, said shield member having a cross sectional area which is less than the maximum cross sectional area of said balance member by a selected amount for counteracting to a preselected partial degree the effect of velocity head upon said balance member; and a signalling device responsive to the speed of rotation of said rotor, the angularity of the blades of said impeller and the difference in cross sectional areas of said shield and balance member being selected for producing downstream dynamic pressure forces on said balance member in response to fluid flow through said conduit, which, in combination with the downstream pressure head forces also acting on said balance member, are capable of counterbalancing upstream forces acting thereon due to said relatively high pressure head acting on the downstream end areas thereof.

5. In apparatus of the class described, a conduit having a passage therethrough with portions of differing cross-sectional area; a member mounted in said conduit for movement along the longitudinal axis of said conduit for coacting with said passage portions for varying an orifice for the flow of fluid, the downstream end area of said member being disposed in a region of relatively higher pressure head than the upstream end area thereof, whereby an upstream pressure head force arises in response to the passage of fluid through the conduit tending to urge said member upstream and resulting from the higher pressure head which is greater than the opposing pressure head downstream force tending to urge said member downstream resulting from the pressure head on such upstream end area; a shield mounted upstream and near to said member, said shield being of a cross-sectional area for counteracting to a preselected partial degree the dynamic pressure which normally would act upon said member to urge same downstream but for such shield, said member thus being subject to a residual dynamic pressure; a bladed impeller mounted for rotation and free axial movement in said conduit; means for interconnecting said member and impeller for holding same in fixed relation, said blades being subject to a blade dynamic pressure tending to urge same downstream, the cross-sectional area of said shield and the angularity of said blades being selected for producing in response to the passage of fluid through said conduit downstream force components of such residual and blade dynamic pressures plus such component of said downstream pressure head force which are balanced against said upstream pressure head force acting on said member; and means operatively connected with said impeller for indicating the speed of rotation thereof.

References Cited in the file of this patent

UNITED STATES PATENTS

| 200,676 | Walsh | Feb. 26, 1878 |
| 1,016,934 | Charlton | Feb. 13, 1912 |
| 1,303,443 | Wohlenberg | May 13, 1919 |
| 1,400,523 | Chrisman | Dec. 20, 1921 |

FOREIGN PATENTS

| 14,060 | Great Britain | 1852 |